US009571730B2

(12) United States Patent
Lee

(10) Patent No.: US 9,571,730 B2
(45) Date of Patent: Feb. 14, 2017

(54) METHOD FOR INCREASING A DETECTING RANGE OF AN IMAGE CAPTURE SYSTEM AND RELATED IMAGE CAPTURE SYSTEM THEREOF

(71) Applicant: Etron Technology, Inc., Hsinchu (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 113 days.

(21) Appl. No.: 14/613,380

(22) Filed: Feb. 4, 2015

(65) Prior Publication Data
US 2015/0229822 A1  Aug. 13, 2015

(30) Foreign Application Priority Data

Feb. 10, 2014  (TW) .............. 103104288 A

(51) Int. Cl.
*H04N 5/232* (2006.01)
*G06T 7/00* (2006.01)
(52) U.S. Cl.
CPC ......... *H04N 5/23232* (2013.01); *G06T 7/0075* (2013.01)

(58) Field of Classification Search
CPC .. H04N 13/0271; H04N 5/2355; H04N 5/247; G06T 7/0075
See application file for complete search history.

(56) References Cited

U.S. PATENT DOCUMENTS

2012/0327189 A1* 12/2012 Muramatsu .............. G01C 3/06
348/46

* cited by examiner

*Primary Examiner* — Christopher K Peterson
(74) *Attorney, Agent, or Firm* — Winston Hsu; Scott Margo

(57) ABSTRACT

A method for increasing a detection range of an image capture system includes at least one first image capture unit capturing a first image and at least one second image capture unit capturing a second image; a processor determining an object according to the first image; the processor generating a third image group with a first resolution according to the first image and the second image; the processor generating a fourth image group with a second resolution; the processor determining whether the object exists within an effective range of the image capture system corresponding to the second resolution, within a weak range of the image capture system corresponding to the second resolution, or within the effective range and the weak range of the image capture system corresponding to the second resolution to generate a determination result; and the processor executing a corresponding operation according to the determination result.

16 Claims, 15 Drawing Sheets

METHOD FOR INCREASING A DETECTING RANGE OF AN IMAGE CAPTURE SYSTEM AND RELATED IMAGE CAPTURE SYSTEM THEREOF

BACKGROUND OF THE INVENTION

1. Field of the Invention

The present invention relates to a method for increasing a detection range of an image capture system and a related image capture system, and particularly to a method for increasing a detection range of an image capture system and a related image capture system that can change resolutions of images captured by the image capture system according to an image processing method to increase the detection range of the image capture system.

2. Description of the Prior Art

An image capture system determines an effective range of a depth information according to a distance (baseline) between two cameras within the image capture system, a horizontal search range, and an image resolution of the image capture system, wherein the image capture system can clearly determine a distance between any object and the image capture system within the effective range. When the distance between the two cameras is greater, the effective range of the image capture system is farther, and when the distance between the two cameras is shorter, the effective range of the image capture system is nearer; when the horizontal search range of the image capture system is greater, the effective range of the image capture system can cover places closer to the image capture system under the same conditions; and when the image resolution of the image capture system is higher, the effective range of the image capture system can cover places farther to the image capture system under the same conditions.

The prior art utilizes increase of the image resolution and the horizontal search range to enlarge the effective range of the image capture system, but increase of the image resolution and the horizontal search range will both increase calculation loading of a depth engine of the image capture system and chip design difficulty applied to the image capture system, resulting in cost of the image capture system being increased significantly. Therefore, how to improve the prior art to enlarge the effective range of the image capture system becomes an important issue.

SUMMARY OF THE INVENTION

An embodiment of the present invention provides a method for increasing a detection range of an image capture system, wherein the image capture system includes at least one first image capture unit, at least one second image capture unit, and a processor. The method includes the at least one first image capture unit capturing a first image, and the at least one second image capture unit capturing a second image; the processor determining an object according to the first image; the processor generating a third image group with a first resolution according to the first image and the second image; the processor generating a fourth image group with a second resolution; the processor determining whether the object exists within an effective range of the image capture system corresponding to the second resolution, within a weak range of the image capture system corresponding to the second resolution, or within the effective range and the weak range of the image capture system corresponding to the second resolution to generate a determination result; and the processor executing a corresponding operation according to the determination result.

Another embodiment of the present invention provides an image capture system capable of increasing a detection range. The image capture system includes at least one first image capture unit, at least one second image capture unit, and a processor. The at least one first image capture unit captures a first image. The at least one second image capture unit captures a second image. The processor determines an object according to the first image, generates a third image group with a first resolution according to the first image and the second image, generates a fourth image group with a second resolution, determines whether the object exists within an effective range of the image capture system corresponding to the second resolution, within a weak range of the image capture system corresponding to the second resolution, or within the effective range and the weak range of the image capture system corresponding to the second resolution to generate a determination result, and executes a corresponding operation according to the determination result.

The present invention provides a method for increasing a detection range of an image capture system and an image capture system capable of increasing a detection range. The method and the image capture system utilize a processor to change resolutions of images captured by the image capture system according to an image processing method to increase the detection range of the image capture system. Thus, compared to the prior art, because the present invention utilizes the image processing method to increase the detection range of the image capture system, the image capture system provided by the present invention not only has a simpler structure, but also has lower cost.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
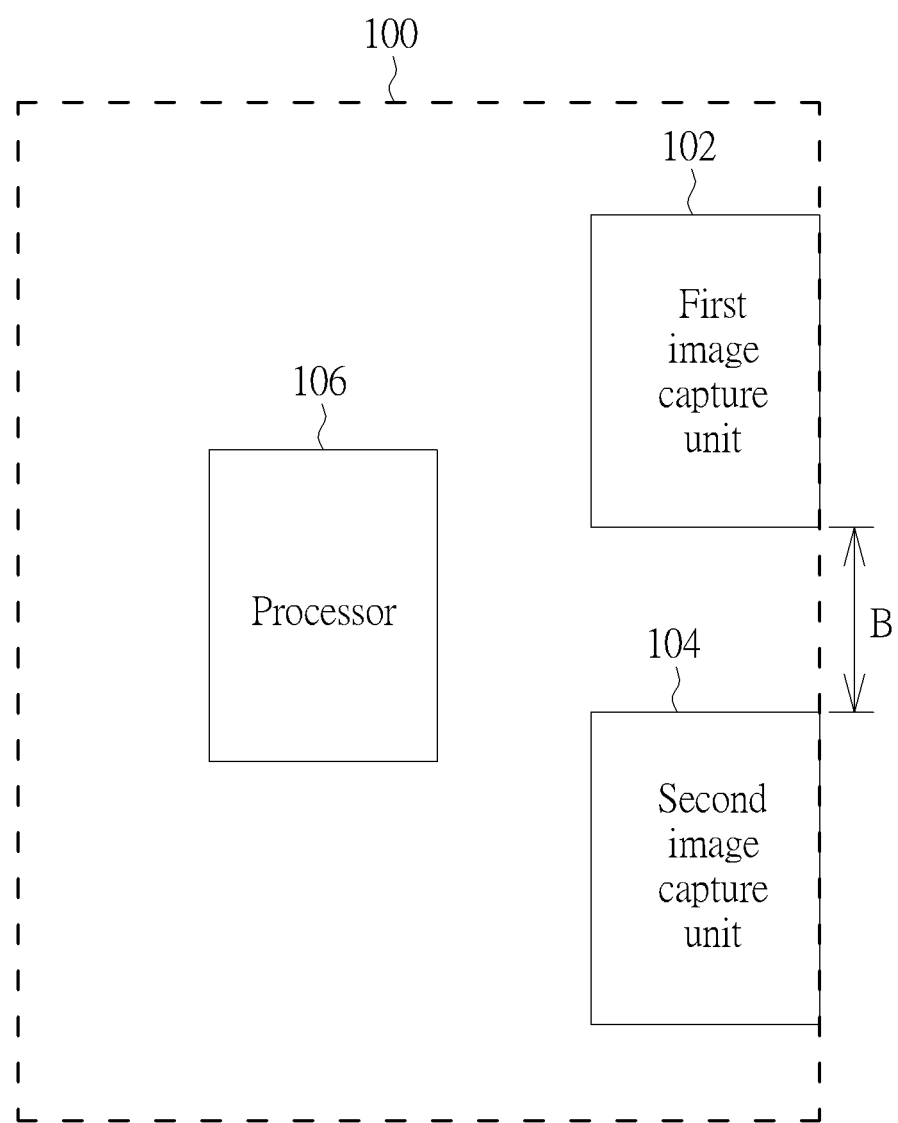
FIG. 1 is a diagram illustrating an image capture system 100 for increasing a detection rang.
Figure 2:
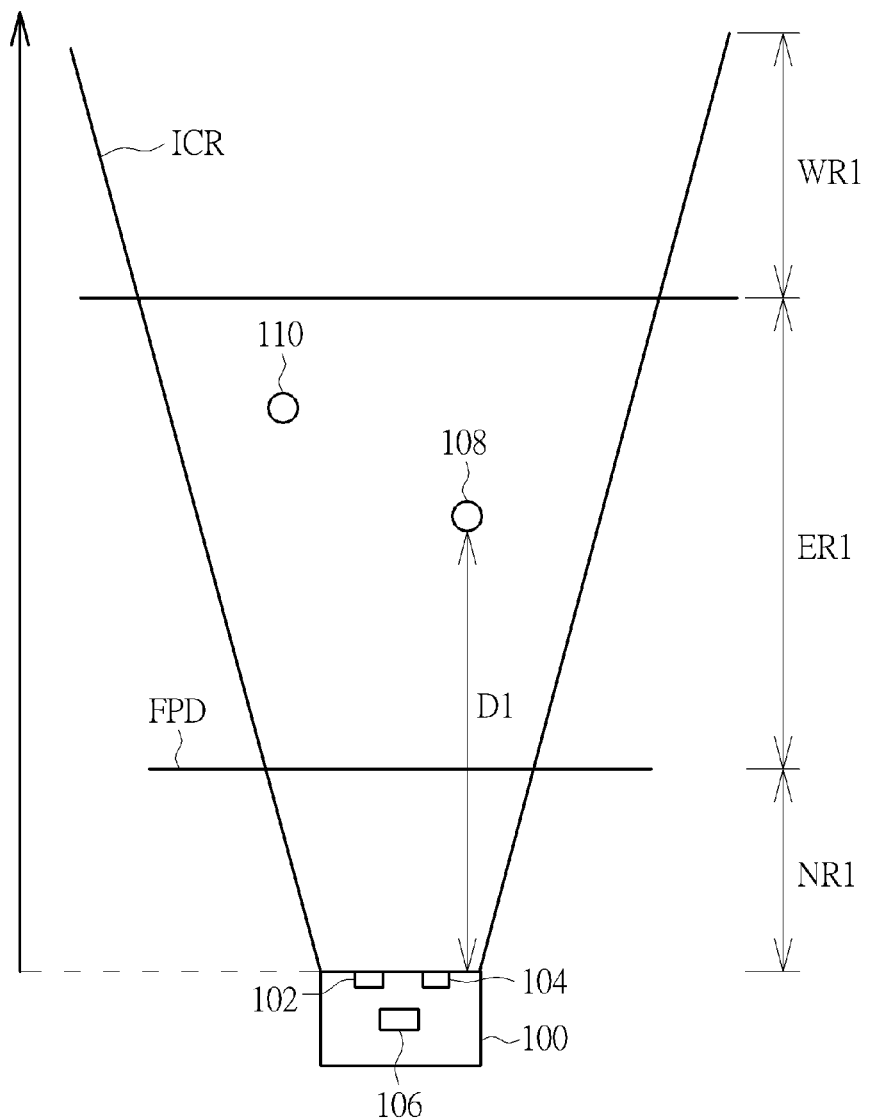
FIG. 2 is a diagram illustrating a non-effective range, an effective range, and a weak range within an image capture range of the image capture system corresponding to a first resolution.
Figure 3:
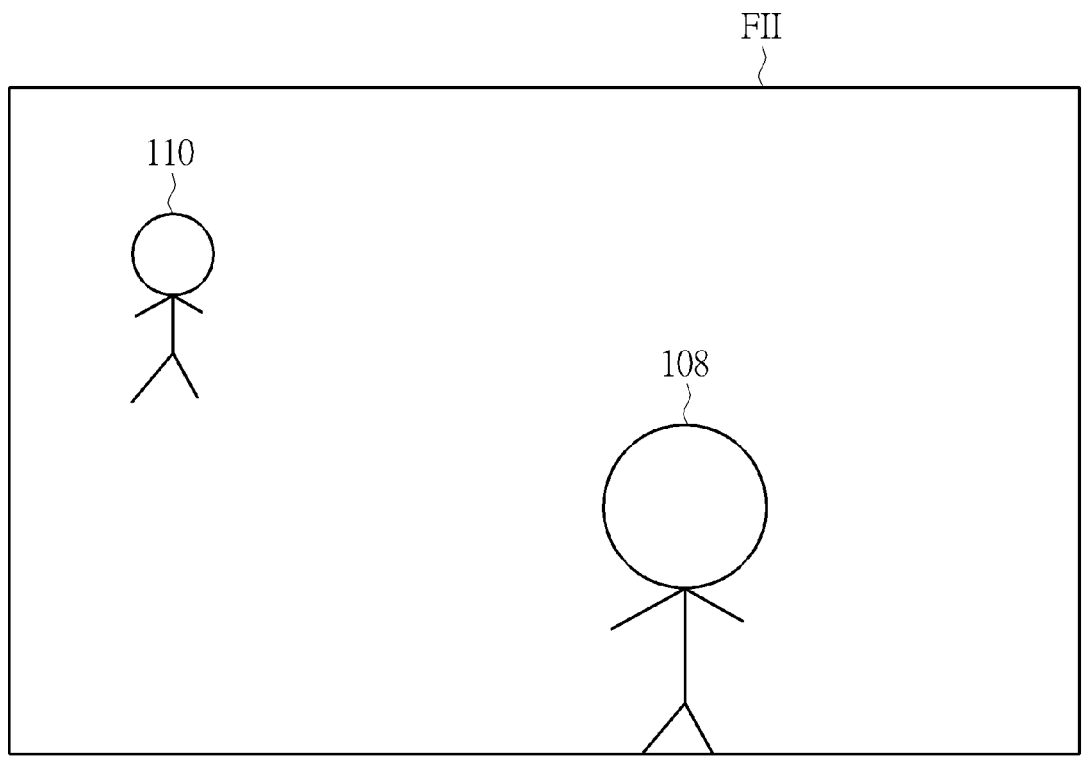
FIG. 3 is a diagram illustrating a first image captured by the first image capture unit.
Figure 4:
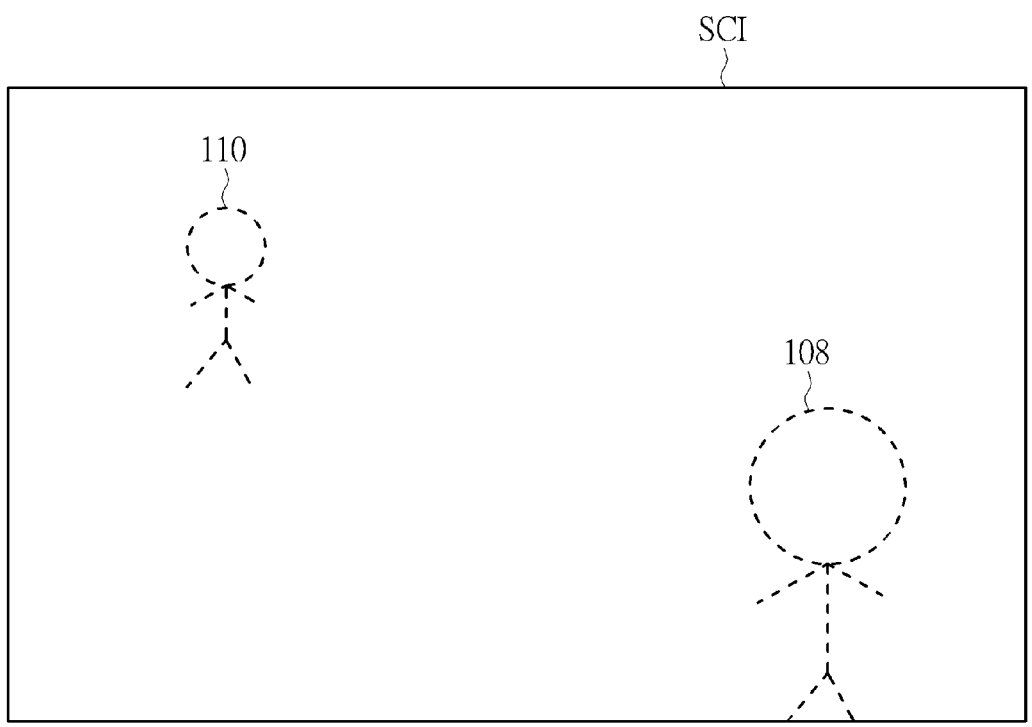
FIG. 4 is a diagram illustrating a second image captured by the second image capture unit 104.

Please refer to FIG. 1. FIG. 1 is a diagram illustrating an image capture system 100 for increasing a detection rang. As shown in FIG. 1, the image capture system 100 includes a first image capture unit 102, a second image capture unit 104, and a processor 106, wherein a distance B between the first image capture unit 102 and the second image capture unit 104 is fixed. But, in another embodiment of the present invention, the distance B between the first image capture unit 102 and the second image capture unit 104 is changeable. In addition, the present invention is not limited to the image capture system 100 only including one first image capture unit and one second image capture unit. That is to say, the image capture system 100 can include at least one first image capture unit and at least one second image capture unit. Please refer to FIG. 2, FIG. 3, and FIG. 4. FIG. 2 is a diagram illustrating a non-effective range NR1, an effective range ER1, and a weak range WR1 within an image capture range ICR of the image capture system 100 corresponding to a first resolution (a predetermined resolution of the image capture system 100), FIG. 3 is a diagram illustrating a first image FII captured by the first image capture unit 102, and FIG. 4 is a diagram illustrating a second image SCI captured by the second image capture unit 104. As shown in FIG. 2, the image capture system 100 cannot determine a distance between any object and the image capture system 100, or misjudge a distance between any object and the image capture system 100 according to an image with the first resolution within the non-effective range NR1 corresponding to the first resolution; the image capture system 100 can clearly determine a distance between any object and the image capture system 100 according to an image with the first resolution within the effective range ER1 corresponding to the first resolution; and the image capture system 100 does not clearly determine a distance between any object and the image capture system 100, but does also not misjudge a distance between any object and the image capture system 100 according to an image with the first resolution within the weak range WR1 corresponding to the first resolution. As shown in FIG. 2 and FIG. 3, when 2 users 108, 110 exist within the effective range ER1 corresponding to the first resolution, the first image capture unit 102 can capture the corresponding first image FII, wherein the users 108, 110 included in the first image FII are represented as solid lines; and as shown in FIG. 2 and FIG. 4, when the users 108, 110 exist within the effective range ER1 of the image capture system 100, the second image capture unit 104 can capture the corresponding second image SCI, wherein the users 108, 110 included in the second image SCI are represented as dotted lines. After the first image capture unit 102 capture the first image FII and the second image capture unit 104 capture the second image SCI, the processor 106 can determine a target object (e.g. the user 108 or the user 110) corresponding to a moving corresponding object from the users 108, 110 according to the moving corresponding object included in the first image FII and the second image SCI, wherein the target object is an operator. For example, when a swing range of a hand (that is, the corresponding object) of the user 108 included in the first image FII and the second image SCI is greater than a predetermined value, the processor 106 can determine that the user 108 is the operator according to the hand of the user 108. But, the present invention is not limited to the user 108 being the operator. In another embodiment of the present invention, the processor 106 can determine the operator corresponding to the corresponding object from the users 108, 110 according to face features corresponding to the corresponding object included in the first image FII or the second image SCI.

Figure 5:
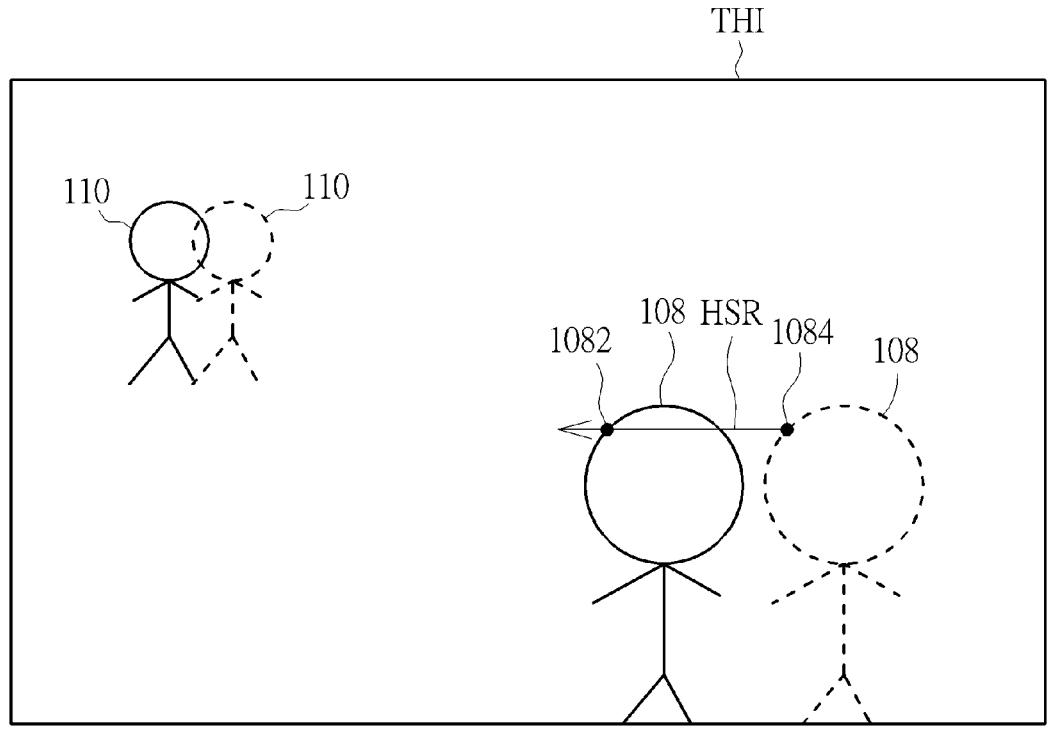
FIG. 5 is a diagram illustrating an image superposition of a third image group with the first resolution generated by the processor.
Figure 6:
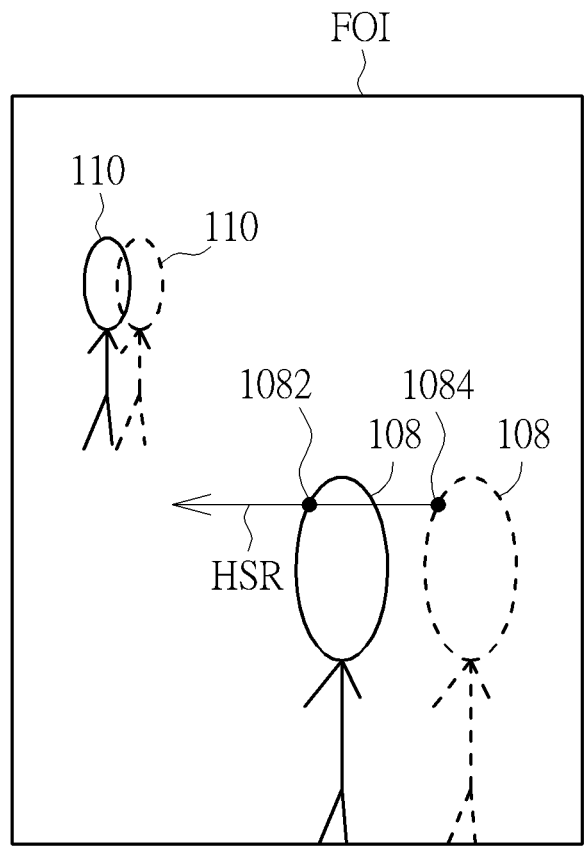
FIG. 6 is a diagram illustrating an image superposition of a fourth image group with a second resolution generated by the processor.

Please refer to FIG. 5. FIG. 5 is a diagram illustrating an image superposition of a third image group THI with the first resolution generated by the processor 106. As shown in FIG. 5, the processor 106 can generate the third image group THI with the first resolution according to the first image FII and the second image SCI, wherein the image superposition (that is, the third image group THI) shown in FIG. 5 is formed by superposition of the first image FII and the second image SCI to describe the present invention. However, in fact, the processor 106 still processes each image (the first image FII or the second image SCI) of the third image group THI, respectively. The processor 106 can generate a depth information according to the third image group THI, and the processor 106 can determine whether an object is located within the non-effective range NR1, the effective range ER1, or the weak range WR1 of the image capture system 100 corresponding to the first resolution according to the depth information corresponding to the third image group THI. When the processor 106 determines that the 2 users 108, 110 exist within the effective range ER1 corresponding to the first resolution of the image capture range ICR of the image capture system 100 according to the depth information corresponding to the third image group THI, a distance between a first position 1082 of the operator (the user 108) within the third image group THI corresponding to the first image FII and a second position 1084 of the operator (the user 108) within the third image group THI corresponding to the second image SCI is less than a horizontal search range HSR. But, the present invention is not limited to a search range of the image capture system 100 being a horizontal search range. That is to say, the search range of the image capture system 100 can also be a vertical search range or a non-horizontal search range. Please refer to FIG. 6. FIG. 6 is a diagram illustrating an image superposition of a fourth image group FOI with a second resolution generated by the processor 106. As shown in FIG. 6, the processor 106 can generate the fourth image group FOI with the second resolution according to the first image FII and the second image SCI, or according to the third image group THI, wherein the second resolution is lower than the first resolution, the first resolution is a horizontal resolution, and data quantity of the fourth image group FOI is less than data quantity of the third image group THI. For example, as shown in FIG. 6, the second resolution is equal to a half of the first resolution. But, the present invention is not limited to the second resolution being equal to the half of the first resolution. That is to say, any configuration in which the second resolution is less than the first resolution falls within the scope of the present invention. In another embodiment of the present invention, the processor 106 can also generate the fourth image group FOI with the second resolution according to the first image FII and the second image SCI, or according to the third image group THI, wherein the second resolution is higher than the first resolution, and data quantity of the fourth image group FOI is greater than data quantity of the third image group THI.

Figure 7:
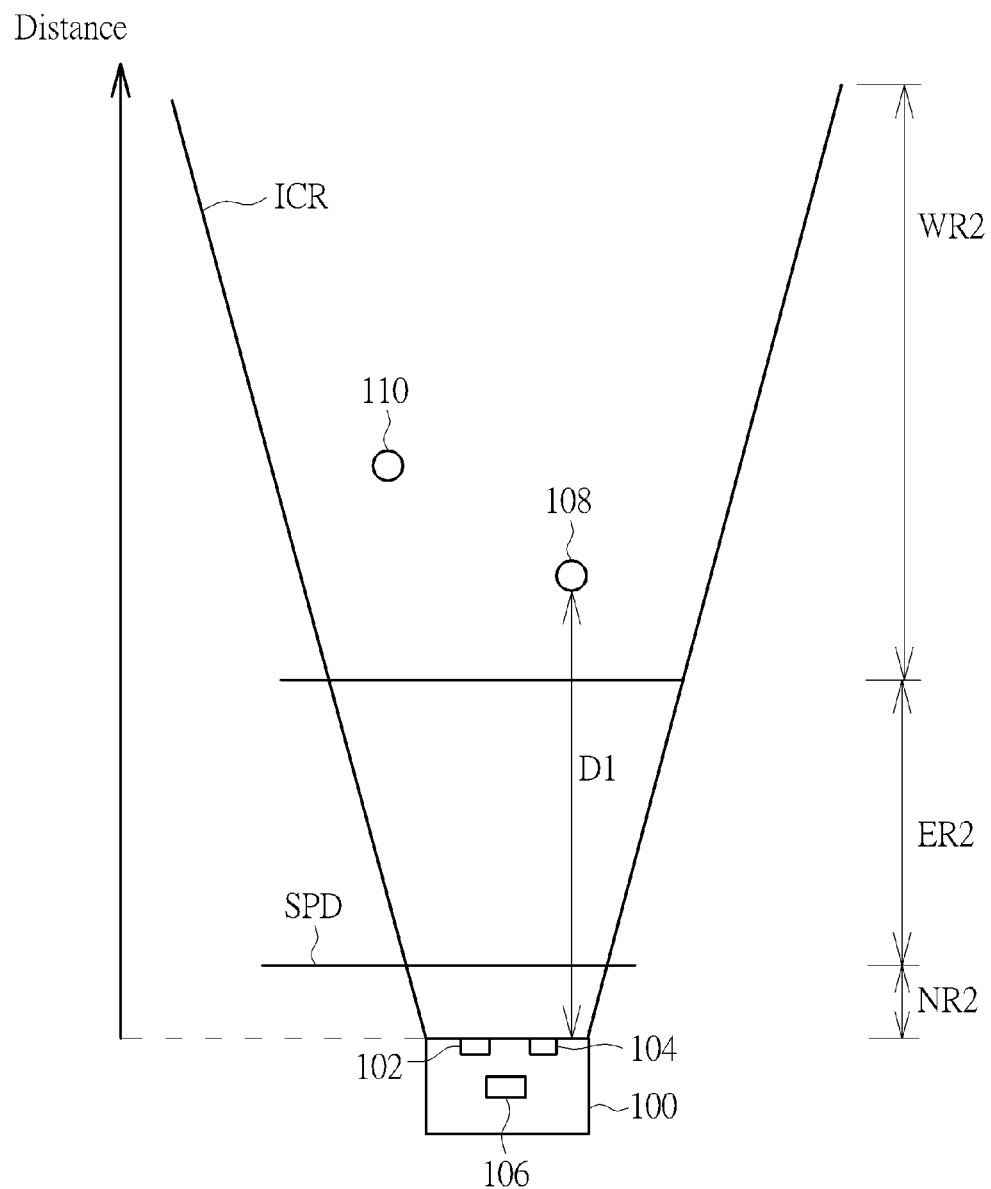
FIG. 7 is a diagram illustrating a non-effective range, an effective range, and a weak range within an image capture range of the image capture system corresponding to a second resolution.

As shown in FIG. 2, FIG. 6, and FIG. 7, because the users 108, 110 exist within the effective range ER1 (as shown in FIG. 2) corresponding to the first resolution within the image capture range ICR of the image capture system 100, and the second resolution is lower than the first resolution, a distance between a first position 1082 of the operator (the user 108) within the fourth image group FOI corresponding to the first image FII and a second position 1084 of the operator (the user 108) within the fourth image group FOI corresponding to the second image SCI is also less than the horizontal search range HSR. Because the distance between the first position 1082 of the operator (the user 108) within the fourth image group FOI corresponding to the first image FII and the second position 1084 of the operator (the user 108) within the fourth image group FOI corresponding to the second image SCI is less than the horizontal search range HSR, the processor 106 first utilizes a hand or a face of the operator (the user 108) within the fourth image group FOI with the second resolution to determine a distance D1 between the operator (the user 108) and the image capture system 100, wherein the distance D1 is greater than a first predetermined distance FPD (as shown in FIG. 2). However, because the distance D1 is greater than the first predetermined distance FPD, the operator (the user 108) may be located within a weak range WR2 of the image capture range ICR of the image capture system 100 corresponding to the second resolution (as shown in FIG. 7), wherein ER2 is an effective range corresponding to the second resolution within the image capture range ICR of the image capture system 100, and NR2 is a non-effective range corresponding to the second resolution within the image capture range ICR of the image capture system 100. Therefore, when the processor 106 determines a distance between the operator (the user 108) and the image capture system 100 next time, the processor 106 utilizes another third image group with the first resolution to determine the distance between the operator (the user 108) and the image capture system 100. However, after the processor 106 determines that the distance between the operator (the user 108) and the image capture system 100 is less than the first predetermined distance FPD, the processor 106 utilizes another fourth image group with the second resolution to determine the distance between the operator (the user 108) and the image capture system 100 when the processor 106 determines the distance between the operator (the user 108) and the image capture system 100 next time. In addition, in another embodiment of the present invention, the processor 106 can execute an image process (e.g. scaled/cropped) on the third image group THI with the first resolution to generate a new depth information, wherein a size of an output image corresponding to the new depth information can be equal to a size of an output image corresponding to the depth information corresponding to the fourth image group FOI with the second resolution.

Figure 8:
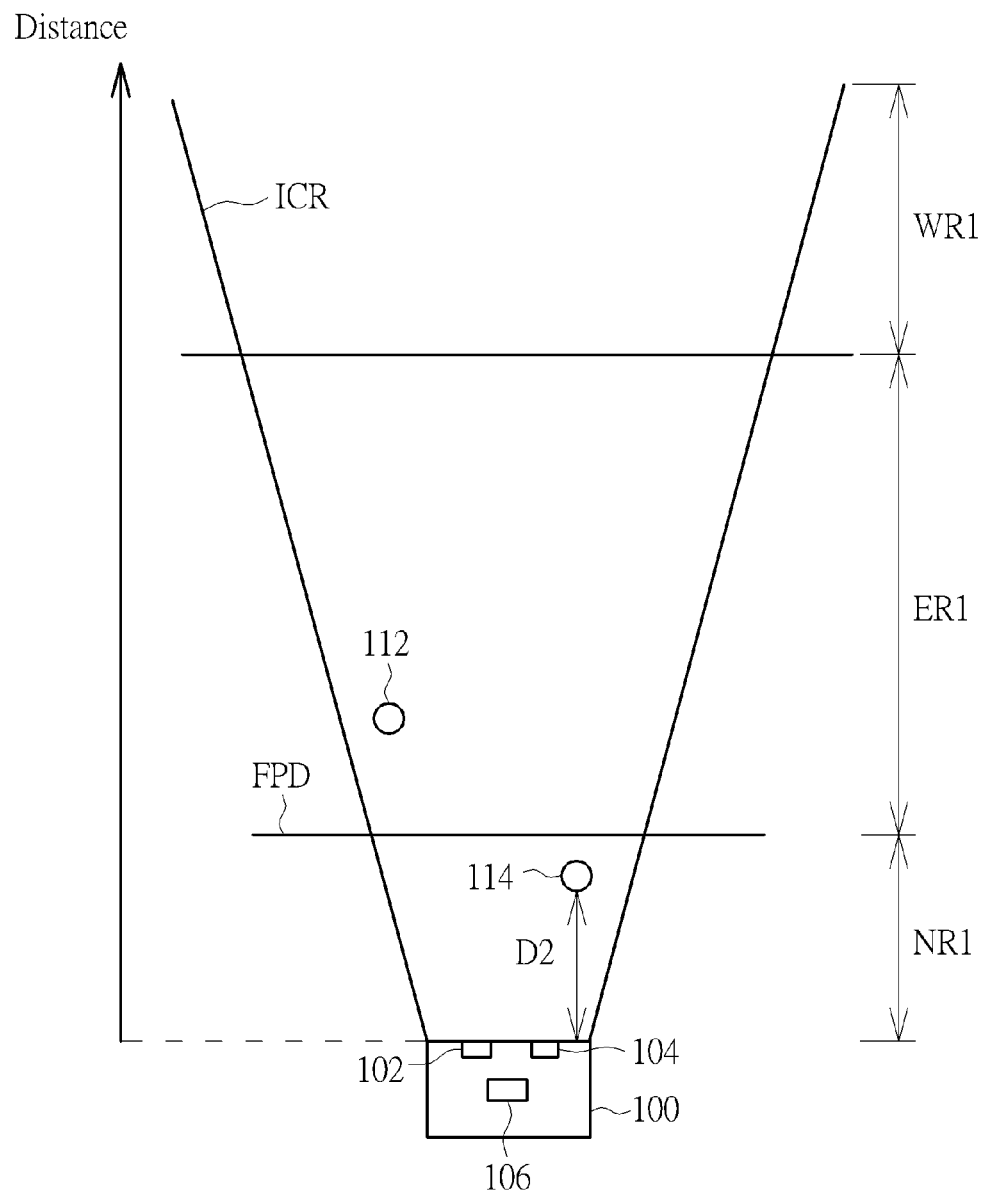
FIG. 8 is a diagram illustrating a user existing within the effective range corresponding to the first resolution of the image capture system and a user existing within the non-effective range corresponding to the first resolution of image capture system.
Figure 9:
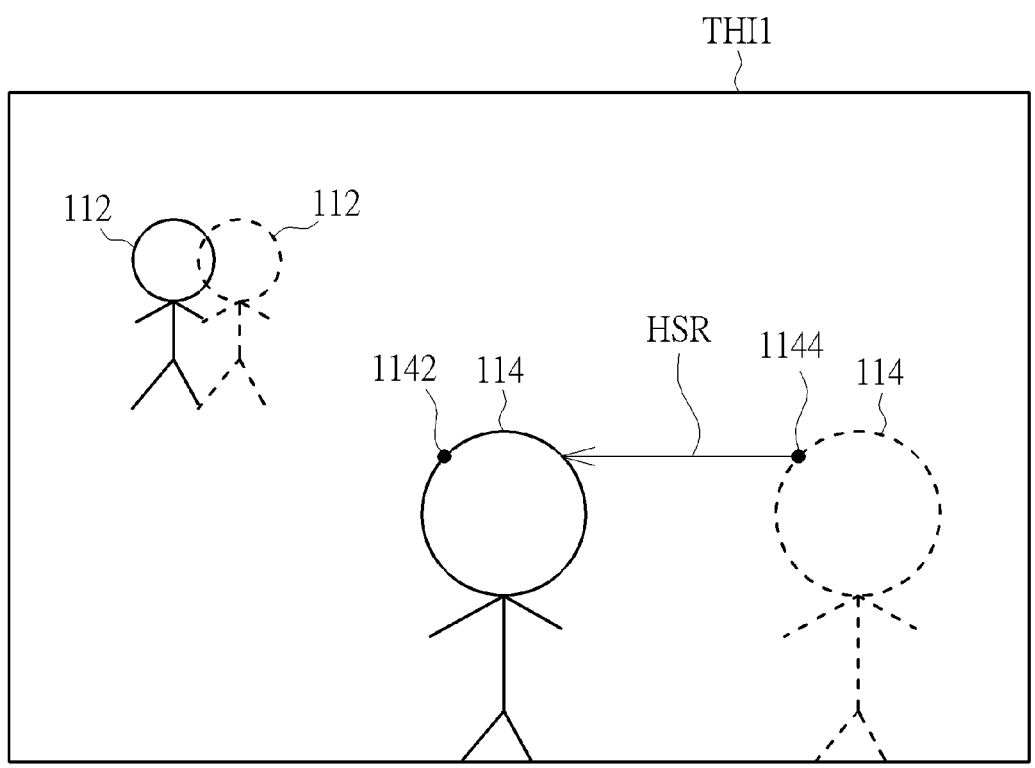
FIG. 9 is a diagram illustrating an image superposition of a third image group with the first resolution generated by the processor.
Figure 10:
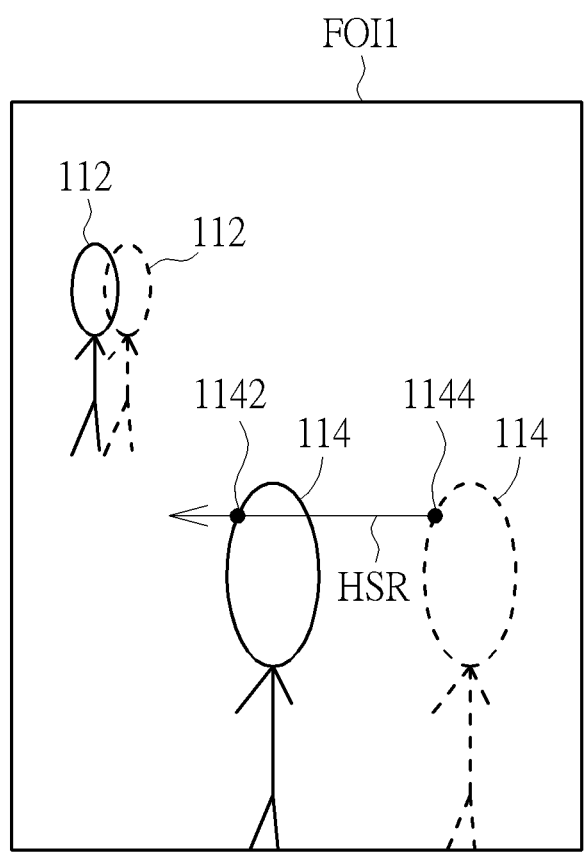
FIG. 10 is a diagram illustrating an image superposition of a fourth image group with the second resolution generated by the processor.

Please refer to FIG. 8, FIG. 9, and FIG. 10. FIG. 8 is a diagram illustrating a user 112 existing within the effective range ER1 corresponding to the first resolution of the image capture system 100 and a user 114 existing within the non-effective range NR1 corresponding to the first resolution of image capture system 100, FIG. 9 is a diagram illustrating an image superposition of a third image group THI1 with the first resolution generated by the processor 106, and FIG. 10 is a diagram illustrating an image superposition of a fourth image group FOI1 with the second resolution generated by the processor 106. As shown in FIG. 8 and FIG. 9, the processor 106 can determine the user 114 as an operator according to the above mentioned operation principles. Meanwhile, the processor 106 can generate a depth information according to the third image group THI1, and determine that the user 114 exists within the non-effective range NR1 of the image capture system 100 corresponding to the first resolution according to the depth information corresponding to the third image group THI1. Because the user 114 exists within the non-effective range NR1 of the image capture system 100 corresponding to the first resolution, a distance between a first position 1142 of the operator (the user 114) within the third image group THI1 corresponding to a first image and a second position 1144 of the operator (the user 114) within the third image group THI1 corresponding to a second image is greater than the horizontal search range HSR. Then, the processor 106 can generate a fourth image group FOI1 with the second resolution (as shown in FIG. 10) according to the first image and the second image, or according to the third image group THI1, wherein the second resolution is lower than the first resolution. As shown in FIG. 10, because a distance between a first position 1142 of the operator (the user 114) within the fourth image group FOI1 corresponding to the first image and a second position 1144 of the operator (the user 114) within the fourth image group FOI1 corresponding to the second image is less than the horizontal search range HSR, the processor 106 can determine a distance D2 between the operator (the user 114) and the image capture system 100 according to a hand or a face of the operator (the user 114) within the fourth image group FOI1 with the second resolution, wherein the distance D2 is less than the first predetermined distance FPD (as shown in FIG. 8). Therefore, when the processor 106 determines the distance between the operator (the user 114) and the image capture system 100 next time, the processor 106 utilizes another fourth image group with the second resolution to determine the distance between the operator (the user 114) and the image capture system 100.

Figure 11:
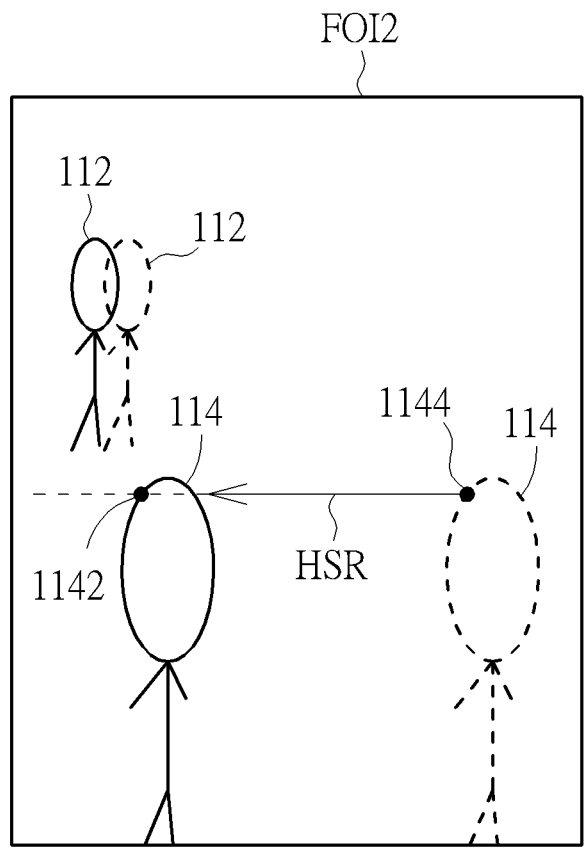
FIG. 11 is a diagram illustrating an image superposition of a fourth image group with the second resolution generated by the processor.

Please refer to FIG. 11. FIG. 11 is a diagram illustrating an image superposition of a fourth image group FOI2 with the second resolution generated by the processor 106. As shown in FIG. 11, the processor 106 can generate a depth information according to the fourth image group FOI2, and determine that the operator (the user 114) exists the non-effective range NR2 of the image capture system 100 corresponding to the second resolution according to the depth information corresponding to the fourth image group FOI2. Because a distance between a first position 1142 of the operator (the user 114) within the fourth image group FOI2 corresponding to the first image and a second position 1144 of the operator (the user 114) within the fourth image group FOI2 corresponding to the second image is greater than the horizontal search range HSR, the processor 106 can generate a fifth image group with a third resolution according to the above mentioned method for generating the fourth image group FOI2, and the fourth image group FOI2, wherein the third resolution is lower than the second resolution. When the processor 106 generates a depth information according to the fifth image group, and determines that the operator (the user 114) exists within an effective range of the image capture system 100 corresponding to the third resolution according to the depth information corresponding to the fifth image group. When a distance between a first position of the operator (the user 114) within the fifth image group corresponding to the first image and a second position of the operator (the user 114) within the fifth image group corresponding to the second image is less than the horizontal search range HSR, the processor 106 can determine that the distance between the operator (the user 114) and the image capture system 100 according to the hand or the face of the operator (the user 114) within the fifth image group with the third resolution. After the processor 106 determines that the distance between the operator (the user 114) and the image capture system 100 is greater than a second predetermined distance SPD (as shown in FIG. 7), the processor 106 utilizes another fourth image group with the second resolution to determine the distance between the operator (the user 114) and the image capture system 100 next time; and after the processor 106 the processor 106 determines that the distance between the operator (the user 114) and the image capture system 100 is less than the second predetermined distance SPD, the processor 106 utilizes another fifth image group with the third resolution to determine the distance between the operator (the user 114) and the image capture system 100 next time. In addition, if the processor 106 determines that the operator (the user 114) exists within a non-effective range of the image capture system 100 corresponding to the third resolution, meanwhile the distance between the first position of the operator (the user 114) within the fifth image group corresponding to the first image and the second position of the operator (the user 114) within the fifth image group corresponding to the second image is still greater than the horizontal search range HSR, the processor 106 generates a sixth image group with a fourth resolution according to the fifth image group, wherein the fourth resolution is lower than the third resolution. Therefore, the processor 106 can execute the above mentioned methods until the processor 106 determines that the distance between the operator (the user 114) and the image capture system 100.

Further, in another embodiment of the present invention, the operator can pre-set an expectation distance between the operator and the image capture system 100. Then, the processor 106 of the image capture system 100 can select an optimal resolution according to the above mentioned methods for determining the distance between the operator and the image capture system 100.

Figure 12:
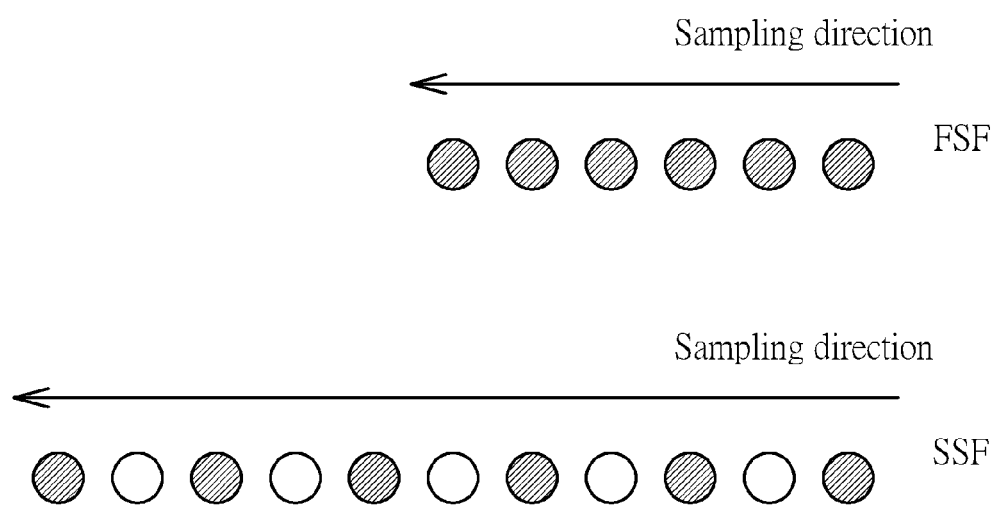
FIG. 12 is a diagram illustrating a first sampling rate and a second sampling rate according to another embodiment of the present invention.
Figure 13:
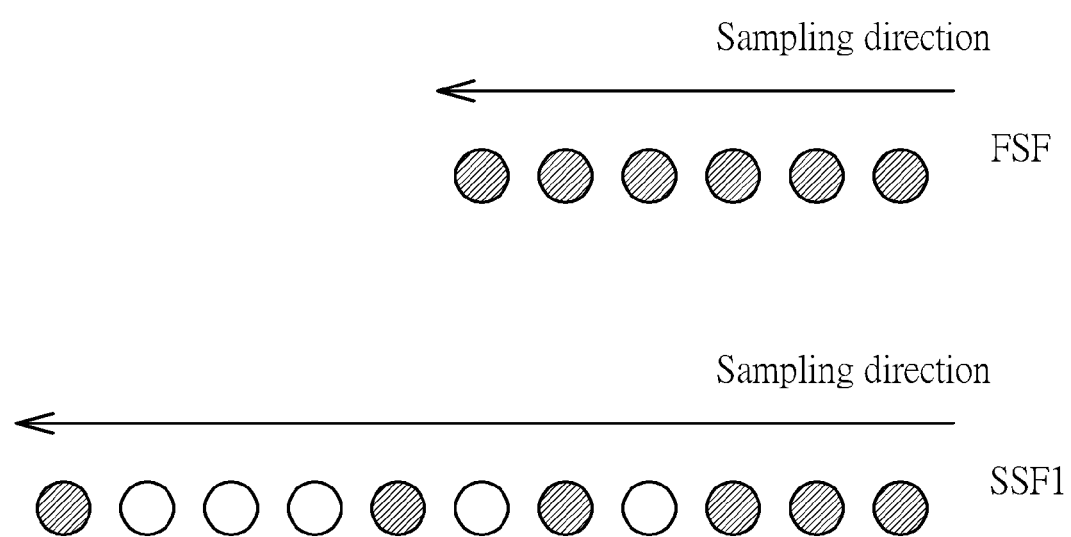
FIG. 13 is a diagram illustrating a first sampling rate and a second sampling rate according to another embodiment of the present invention.

Please refer to FIG. 12. FIG. 12 is a diagram illustrating a first sampling rate FSF and a second sampling rate SSF according to another embodiment of the present invention. As shown in FIG. 12, the above mentioned third image group (e.g. the third image group THI1 as shown in FIG. 9 and the third image group THI as shown in FIG. 5) with the first resolution can be generated by the processor 106 according to the first sampling rate FSF. Then, the processor 106 can sample the first image and the second image for generating the above mentioned third image group to generate the above mentioned fourth image group (e.g. the fourth image group FOI as shown in FIG. 6, the fourth image group FOI1 as shown in FIG. 10, and the fourth image group FOI2 as shown in FIG. 11) with the second resolution according to the second sampling rate SSF lower than the first sampling rate FSF, wherein the second sampling rate SSF is a linear sampling rate, a length and a width of the fourth image group are equal to a length and a width of the third image group. That is to say, the processor 106 stores temporarily data of partial sampling points corresponding to the first sampling rate FSF (white circles shown in FIG. 12), and when the processor 106 generates the above mentioned fourth image group with the second resolution, the processor 106 ignores the data of partial sampling points corresponding to first sampling rate FSF (white circles shown in FIG. 12). Further, in another embodiment of the present invention, a second sampling rate SSF1 is a non-linear sampling rate (as shown in FIG. 13). In addition, operational principles of the second sampling rate SSF1 are the same as those of the second sampling rate SSF, so further description thereof is omitted for simplicity.

In another embodiment of the present invention, the processor 106 can combine the above mentioned method which utilizes the first image and the second image to generate the above mentioned image groups (as shown in FIGS. 5-6 and FIGS. 9-11) with the different resolutions with the above mentioned method which utilizes the different sampling rates (as shown in FIGS. 12-13) to generate the above mentioned image groups with the different resolutions to determine the distance between the operator and the image capture system 100.

In another embodiment of the present invention, the processor 106 can reduce search sampling rates corresponding to the third image group THI/THI1 or the fourth image group FOI/FOI1/FOI2. Because the search sampling rates corresponding to the third image group THI/THI1 or the fourth image group FOI/FOI1/FOI2 are reduced, a horizontal search range corresponding to a lower search sampling rate is greater than the horizontal search range HSR (as shown in FIGS. 5, 6, 9, 10, 11) under the same sampling points.

In another embodiment of the present invention, the processor 106 can capture a region of interest (ROI) to generate the fourth image group FOI/FOI1 with the second resolution according to the first image FII and the second image SCI, or according to the third image group THI/THI1, wherein the second resolution is lower than the first resolution.

Figure 14A:
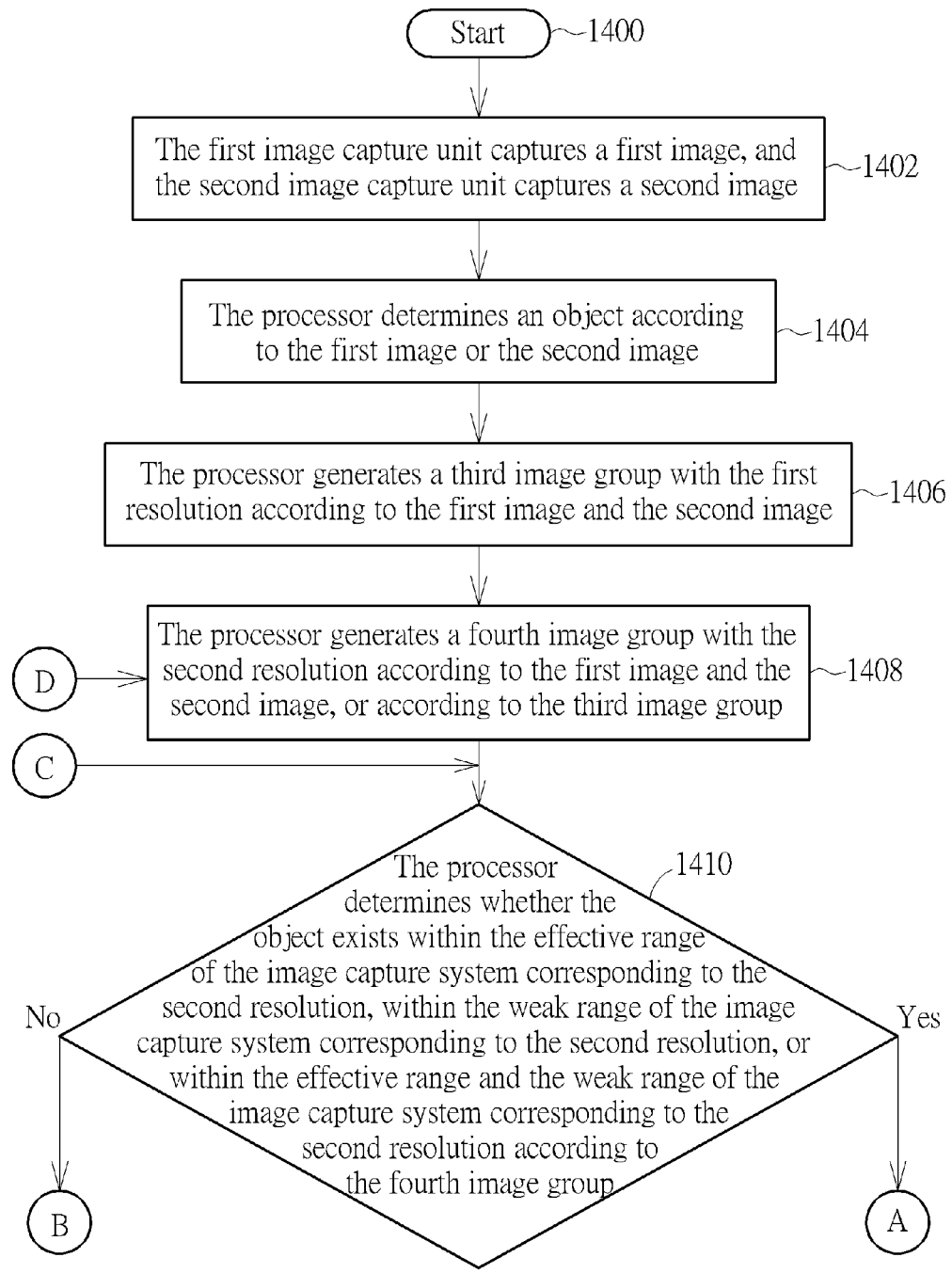
FIGS. 14A, 14B are flowcharts illustrating a method for increasing a detection range of an image capture system according to another embodiment of the present invention.
Figure 14B:
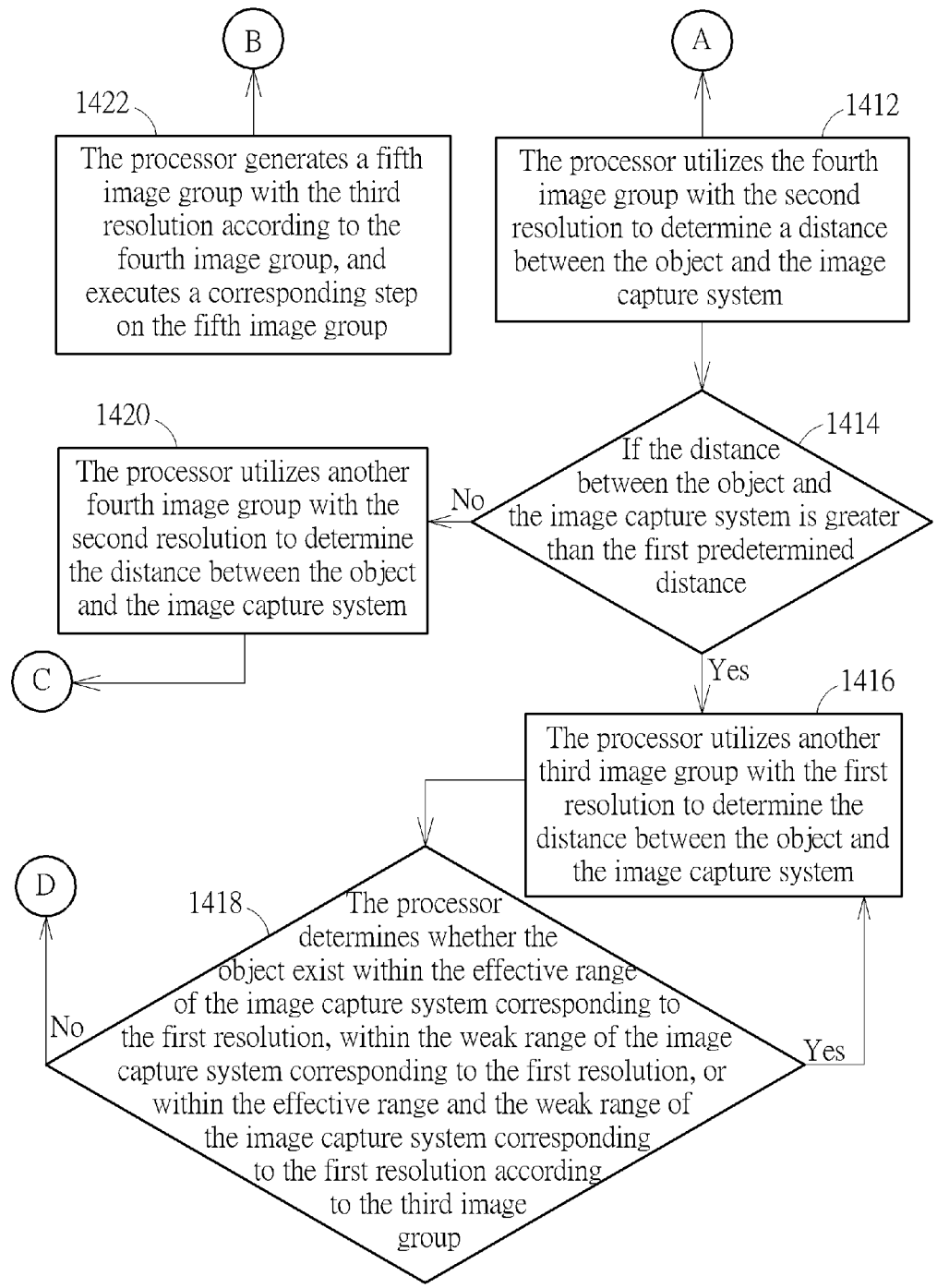

Please refer to FIG. 1 to FIG. 11, and FIGS. 14A, 14B. FIGS. 14A, 14B are flowcharts illustrating a method for increasing a detection range of an image capture system according to another embodiment of the present invention. The method in FIGS. 14A, 14B is illustrated using the image capture system 100 in FIG. 1. Detailed steps are as follows:

Step 1400: Start.

Step 1402: The first image capture unit 102 captures a first image, and the second image capture unit 104 captures a second image.

Step 1404: The processor 106 determines an object according to the first image or the second image.

Step 1406: The processor 106 generates a third image group with the first resolution according to the first image and the second image.

Step 1408: The processor 106 generates a fourth image group with the second resolution according to the first image and the second image, or according to the third image group.

Step 1410: The processor 106 determines whether the object exists within the effective range ER2 of the image capture system 100 corresponding to the second resolution, within the weak range WR2 of the image capture system 100 corresponding to the second resolution, or within the effective range ER2 and the weak range WR2 of the image capture system 100 corresponding to the second resolution according to the fourth image group; if yes, go to Step 1412; if no, go to Step 1422.

Step 1412: The processor 106 utilizes the fourth image group with the second resolution to determine a distance between the object and the image capture system 100.

Step 1414: If the distance between the object and the image capture system 100 is greater than the first predetermined distance FPD; if yes, go to Step 1416; if no, go to Step 1420.

Step 1416: The processor 106 utilizes another third image group with the first resolution to determine the distance between the object and the image capture system 100.

Step 1418: The processor 106 determines whether the object exist within the effective range ER1 of the image capture system 100 corresponding to the first resolution, within the weak range WR1 of the image capture system 100 corresponding to the first resolution, or within the effective range ER1 and the weak range WR1 of the image capture system 100 corresponding to the first resolution according to the third image group; if yes, go to Step 1416; if no, go to Step 1408.

Step 1420: The processor 106 utilizes another fourth image group with the second resolution to determine the distance between the object and the image capture system 100, go to Step 1410.

Step 1422: The processor 106 generates a fifth image group with the third resolution according to the fourth image group, and executes a corresponding step on the fifth image group.

As shown in FIG. 2, the image capture system 100 cannot determine a distance between any object and the image capture system 100, or misjudge a distance between any object and the image capture system 100 according to an image with the first resolution within the non-effective range NR1 corresponding to the first resolution; the image capture system 100 can clearly determine a distance between any object and the image capture system 100 according to an image with the first resolution within the effective range ER1 corresponding to the first resolution; and the image capture system 100 does not clearly determine a distance between any object and the image capture system 100, but does also not misjudge a distance between any object and the image capture system 100 according to an image with the first resolution within the weak range WR1 corresponding to the first resolution. In Step 1402, as shown in FIG. 2 and FIG. 3, when the users 108, 110 exist within the effective range ER1 of the image capture system 100 corresponding to the first resolution, the first image capture unit 102 can capture the corresponding first image FII; and as shown in FIG. 2 and FIG. 4, when the users 108, 110 exist within the effective range ER1 of the image capture system 100 corresponding to the first resolution, the second image capture unit 104 can capture the corresponding second image SCI. In Step 1404, after the first image capture unit 102 capture the first image FII and the second image capture unit 104 capture the second image SCI, the processor 106 can determine the object (that is, an operator (e.g. the user 108 or the user 110)) corresponding to a moving corresponding object from the users 108, 110 according to the moving corresponding object shown in the first image FII and the second image SCI. For example, when a swing range of the hand of the user 108 shown in the first image FII and the second image SCI is greater than the predetermined value, the processor 106 can determine that the user 108 is the operator according to the hand of the user 108. But, the present invention is not limited to the user 108 being the operator.

In Step 1406, as shown in FIG. 5, the processor 106 can generate the third image group THI with the first resolution according to the first image FII and the second image SCI.

In Step 1408, as shown in FIG. 6, the processor 106 can generate the fourth image group FOI with the second resolution according to the first image FII and the second image SCI, or according to the third image group THI, wherein the second resolution is lower than the first resolution, the first resolution is the horizontal resolution, and data quantity of the fourth image group FOI is less than data quantity of the third image group THI. For example, as shown in FIG. 6, the second resolution is equal to a half of the first resolution. But, the present invention is not limited to the second resolution being equal to the half of the first resolution. That is to say, any configuration in which the second resolution is less than the first resolution falls within the scope of the present invention.

In Step 1410, as shown in FIG. 6, the processor 106 can generate a depth information according to the fourth image group FOI, and the processor 106 can determine whether the operator exists within the effective range ER2 of the image capture system 100 corresponding to the second resolution according to the depth information corresponding to the fourth image group FOI, wherein Step 1410 is not necessary.

In Step 1412, as shown in FIG. 2, FIG. 6, and FIG. 7, because the processor 106 determines that the operator exists within the effective range ER1 of the image capture system 100 corresponding to the first resolution, and the distance between the first position 1082 of the operator (the user 108) within the fourth image group FOI corresponding to the first image FII and the second position 1084 of the operator (the user 108) within the fourth image group FOI corresponding to the second image SCI is less than the horizontal search range HSR, the processor 106 first utilizes the hand or the face of the operator (the user 108) within the fourth image group FOI with the second resolution to determine the distance D1 between the operator (the user 108) and the image capture system 100, wherein the distance D1 is greater than the first predetermined distance FPD (as shown in FIG. 2). However, because the distance D1 is greater than the first predetermined distance FPD, the operator (the user 108) may be located within the weak range WR2 of the image capture range ICR of the image capture system 100 corresponding to the second resolution (as shown in FIG. 7). Therefore, in Step 1416, when the processor 106 determines the distance between the operator (the user 108) and the image capture system 100 next time, the processor 106 utilizes another third image group with the first resolution to determine the distance between the operator (the user 108) and the image capture system 100. In Step 1418, when the processor 106 utilizes another third image group with the first resolution to determine the distance between the operator (the user 108) and the image capture system 100, the processor 106 still determines whether the operator exists the effective range ER1 of the image capture system 100 corresponding to the first resolution. If the operator exists the effective range ER1 of the image capture system 100 corresponding to the first resolution, the processor 106 still executes Step 1416; and if the operator does not exist the effective range ER1 of the image capture system 100 corresponding to the first resolution, the processor 106 executes Step 1408.

Please refer to FIG. 8, FIG. 9, and FIG. 10. As shown in FIG. 8 and FIG. 9, when the processor 106 determines the user 114 as an operator according to the above mentioned operation principles processor 106, because the user 114 exists within the non-effective range NR1 of the image capture system 100 corresponding to the first resolution, the distance between the first position 1142 of the operator (the user 114) within the third image group THI1 corresponding to the first image and the second position 1144 of the operator (the user 114) within the third image group THI1 corresponding to the second image is greater than the horizontal search range HSR. Then, in Step 1408, the processor 106 can generate the fourth image group FOI1 with the second resolution (as shown in FIG. 10) according to the first image and the second image, or according to the third image group THI1. In Step 1410 and Step 1412, as shown in FIG. 10, because the processor 106 determines that the operator exists within the effective range ER2 of the image capture system 100 corresponding to the second resolution (that is, the distance between the first position 1142 of the operator (the user 114) within the fourth image group FOI1 corresponding to the first image and the second position 1144 of the operator (the user 114) within the fourth image group FOI1 corresponding to the second image is less than the horizontal search range HSR), the processor 106 can determine the distance D2 between the operator (the user 114) and the image capture system 100 according to the hand or the face of the operator (the user 114) shown in the fourth image group FOI1 with the second resolution second resolution, wherein the distance D2 is less than the first predetermined distance FPD (as shown in FIG. 8). Therefore, in Step 1414 and Step 1420, when the processor 106 determines the distance between the operator (the user 114) and the image capture system 100 next time, the processor 106 utilizes another fourth image group with the second resolution to determine the distance between the operator (the user 114) and the image capture system 100. In Step 1410, after the processor 106 utilizes another fourth image group with the second resolution to determine the distance between the operator (the user 114) and the image capture system 100, the processor 106 still determine whether the operator (the user 114) exists within the effective range ER2 of the image capture system 100 corresponding to the second resolution. If, the operator exists within the effective range ER2 of the image capture system 100 corresponding to the second resolution, the processor 106 executes Step 1412; and if the operator does not exist within the effective range ER2 of the image capture system 100 corresponding to the second resolution, the processor 106 executes Step 1422.

In Step 1422, as shown in FIG. 11, because the operator (the user 114) does not exist within the effective range ER2 of the image capture system 100 corresponding to the second resolution (that is, the distance between the first position 1142 of the operator (the user 114) within the fourth image group FOI2 corresponding to the first image and the second position 1144 of the operator (the user 114) within the fourth image group FOI2 corresponding to the second image is greater than the horizontal search range HSR), the processor 106 can generate a fifth image group with the third resolution according to the above mentioned method for generating the fourth image group FOI2, and the fourth image group FOI2, wherein when the operator (the user 114) exists within the non-effective range NR2 of the image capture system 100 corresponding to the second resolution, the third resolution is lower than the second resolution; and when the operator (the user 114) exists within the weak range WR2 of the image capture system 100 corresponding to the second resolution, the third resolution is higher than the second resolution. When the operator (the user 114) exists within the effective range of the image capture system 100 corresponding to the third resolution, the processor 106 utilizes a hand or a face of the operator (the user 114) within the fifth image group with the third resolution to determine the distance between the operator (the user 114) and the image capture system 100. After the processor 106 determines that the distance between the operator (the user 114) and the image capture system 100 is greater than the second predetermined distance SPD (as shown in FIG. 7), the processor 106 utilizes another fourth image group with the second resolution to determine the distance between the operator (the user 114) and the image capture system 100 next time; and after the processor 106 the processor 106 determines that the distance between the operator (the user 114) and the image capture system 100 is less than the second predetermined distance SPD, the processor 106 utilizes another fifth image group with the third resolution to determine the distance between the operator (the user 114) and the image capture system 100 next time. Further, if the operator (the user 114) does not still exist within the effective range of the image capture system 100 corresponding to the third resolution, does not still exist within the weak range of the image capture system 100 corresponding to the third resolution, or does not still exist within the effective range and the weak range of the image capture system 100 corresponding to the third resolution, the processor 106 generates a sixth image group with the fourth resolution according to the fifth image group, wherein when the operator (the user 114) exists within the non-effective range of the image capture system 100 corresponding to the third resolution, the fourth resolution is lower than the third resolution; and when the operator (the user 114) exists within a weak range of the image capture system 100 corresponding to the third resolution, the fourth resolution is higher than the third resolution. Therefore, the processor 106 can execute the above mentioned methods until the processor 106 determines that the distance between the operator (the user 114) and the image capture system 100.

To sum up, the method for increasing the detection range of the image capture system and the image capture system capable of increasing the detection range utilize the processor to change resolutions of images captured by the image capture system according to the above mentioned image processing method to increase the detection range of the image capture system. Thus, compared to the prior art, because the present invention utilizes the above mentioned image processing method to increase the detection range of the image capture system, the image capture system provided by the present invention not only has a simpler structure, but also has lower cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for increasing a detection range of an image capture system, wherein the image capture system comprises at least one first image capture unit, at least one second image capture unit, and a processor, the method comprising:
   the at least one first image capture unit capturing a first image, and the at least one second image capture unit capturing a second image;
   the processor determining an object according to the first image;
   the processor generating a third image group with a first resolution according to the first image and the second image;

the processor generating a fourth image group with a second resolution according to the first image and the second image, or according to the third image group;

the processor determining whether the object exists within an effective range of the image capture system corresponding to the second resolution, within a weak range of the image capture system corresponding to the second resolution, or within the effective range and the weak range of the image capture system corresponding to the second resolution to generate a determination result, wherein when a distance between the object and the image capture system is greater than a first predetermined distance, the object exists within the effective range or the weak range of the image capture system corresponding to the second resolution, and when the distance is less than the first predetermined distance, the object exists within a non-effective range of the image capture system corresponding to the second resolution; and the processor executing a corresponding operation according to the determination result.

2. The method of claim 1, wherein the processor executing the corresponding operation according to the determination result comprises:

when the determination result is that the object exists within the effective range of the image capture system corresponding to the second resolution, within the weak range of the image capture system corresponding to the second resolution, or within the effective range and the weak range of the image capture system corresponding to the second resolution, the processor utilizing the fourth image group with the second resolution to determine the distance between the object and the image capture system.

3. The method of claim 2, further comprising:

after the processor determines the distance between the object and the image capture system is greater than the first predetermined distance, the processor utilizing another third image group with the first resolution to determine the distance between the object and the image capture system next time.

4. The method of claim 2, further comprising:

after the processor determines the distance between the object and the image capture system is less than the first predetermined distance, the processor utilizing another fourth image group with the second resolution to determine the distance between the object and the image capture system next time.

5. The method of claim 1, wherein the processor generating the fourth image group with the second resolution comprises:

the processor capturing a region of interest to generate the fourth image group with the second resolution according to the first image and the second image, or according to the third image group.

6. The method of claim 1, wherein the processor determining whether the object exists within the effective range of the image capture system corresponding to the second resolution comprises:

the processor generating a depth information according to the fourth image group-with the second resolution; and the processor determining whether the object exists within the effective range of the image capture system corresponding to the second resolution, within the weak range of the image capture system corresponding to the second resolution, or within the effective range and the weak range of the image capture system corresponding to the second resolution according to the depth information.

7. The method of claim 1, wherein the second resolution is lower than the first resolution.

8. The method of claim 1, wherein the second resolution is higher than the first resolution.

9. The method of claim 1, wherein the processor generating the third image group with the first resolution according to the first image and the second image comprises:

the processor sampling the first image and the second image to generate the third image group with the first resolution according to a first sampling rate.

10. The method of claim 9, wherein the processor generating the fourth image group with the second resolution comprises:

the processor sampling the first image and the second image to generate the fourth image group with the second resolution according to a second sampling rate lower than the first sampling rate.

11. The method of claim 1, wherein the processor executing the corresponding operation according to the determination result comprises:

when the determination result is that the object exists outside the effective range and the weak range of the image capture system corresponding to the second resolution, the processor generating a fifth image group with a third resolution according to the fourth image group, wherein the third resolution is lower than the second resolution; and the processor determining whether the object exists within an effective range of the image capture system corresponding to the third resolution, within a weak range of the image capture system corresponding to the third resolution, or within the effective range and the weak range of the image capture system corresponding to the third resolution.

12. The method of claim 11, further comprising:

when the processor determines the object exists within the effective range of the image capture system corresponding to the third resolution, within the weak range of the image capture system corresponding to the third resolution, or within the effective range and the weak range of the image capture system corresponding to the third resolution, the processor utilizing the fifth image group with the third resolution to determine the distance between the object and the image capture system.

13. The method of claim 12, further comprising:

after the processor determines the distance between the object and the image capture system is greater than a second predetermined distance, the processor utilizing another fourth image group with the second resolution to determine the distance between the object and the image capture system next time.

14. The method of claim 12, further comprising:

after the processor determines the distance between the object and the image capture system is less than a second predetermined distance, the processor utilizing another fifth image group with the third resolution to determine the distance between the object and the image capture system next time.

15. The method of claim 1, further comprising:

the processor reducing a search sampling rate corresponding to the third image group or the fourth image group to increase a detection range corresponding to the third image group or the fourth image group.

16. An image capture system capable of increasing a detection range, the image capture system comprising:
  at least one first image capture unit capturing a first image;
  at least one second image capture unit capturing a second image; and
  a processor determining an object according to the first image, generating a third image group with a first resolution according to the first image and the second image, generating a fourth image group with a second resolution according to the first image and the second image, or according to the third image group, determining whether the object exists within an effective range of the image capture system corresponding to the second resolution, within a weak range of the image capture system corresponding to the second resolution, or within the effective range and the weak range of the image capture system corresponding to the second resolution to generate a determination result, and executing a corresponding operation according to the determination result, wherein when a distance between the object and the image capture system is greater than a first predetermined distance, the object exists within the effective range or the weak range of the image capture system corresponding to the second resolution, and when the distance is less than the first predetermined distance, the object exists within a non-effective range of the image capture system corresponding to the second resolution.

* * * * *